United States Patent [19]

Bronstein

[11] Patent Number: 4,596,238

[45] Date of Patent: Jun. 24, 1986

[54] INTERIORLY TENSIONED SOLAR REFLECTOR

[75] Inventor: Allen I. Bronstein, Palo Alto, Calif.

[73] Assignee: Sunsteam Ltd., Palo Alto, Calif.

[21] Appl. No.: 753,034

[22] Filed: Jul. 8, 1985

Related U.S. Application Data

[63] Continuation-in-part of Ser. No. 710,581, Mar. 11, 1985, which is a continuation of Ser. No. 526,632, Aug. 26, 1983, Pat. No. 4,510,923.

[51] Int. Cl.[4] ............................................. F24J 2/10
[52] U.S. Cl. .................................. 126/438; 126/451; 350/628; 350/631
[58] Field of Search .............. 126/438, 439, 451, 424, 126/425, 417; 350/628, 631

[56] References Cited

U.S. PATENT DOCUMENTS

| | | | |
|---|---|---|---|
| 3,988,166 | 10/1976 | Beam | 136/89 |
| 4,002,499 | 1/1977 | Winston | 136/206 |
| 4,106,484 | 8/1978 | Dame | 126/438 |
| 4,111,187 | 9/1978 | Wiegand | 126/438 |
| 4,119,365 | 10/1978 | Powell | 126/438 |
| 4,173,397 | 11/1979 | Simpson | 350/295 |
| 4,184,482 | 1/1980 | Cohen | 126/438 |
| 4,205,659 | 6/1980 | Beam | 126/438 |
| 4,230,095 | 10/1980 | Winston | 126/439 |
| 4,240,406 | 12/1980 | Hutchison | 126/438 |
| 4,243,019 | 1/1981 | Severson | 126/438 |
| 4,293,192 | 10/1981 | Bronstein | 350/310 |
| 4,349,733 | 9/1982 | Beam et al. | 250/203 R |
| 4,358,183 | 11/1982 | Whiteford | 350/288 |
| 4,493,313 | 1/1985 | Eaton | 126/438 |
| 4,510,923 | 4/1985 | Bronstein | 126/438 |

FOREIGN PATENT DOCUMENTS 2738665 3/1979 Fed. Rep. of Germany .

OTHER PUBLICATIONS

Sun Seeker Installation and Owner's Manual, King Energy Systems.
Sol-R-Beam Brochure, Beam Engineering, Inc., Jun. 1981.
Sun Seekers Brochure, King Energy Systems, 1983.
Comparison & Solar Concentrators, Rabi, Solar Energy, vol. 18, #51, pp. 93 and 102.

Primary Examiner—Larry Jones
Attorney, Agent, or Firm—Fliesler, Dubb, Meyer & Lovejoy

[57] ABSTRACT

An improvement is disclosed in a solar reflector having a first form member, a second form member, the first and second form members having peripheries having identical form surfaces along portions thereof, a generally rectangular flexible sheet having a reflective surface, opposite edges and lateral edges, a structure which secures the opposite edges to the identical form surfaces with the reflective surface being infacing, the reflective surface having a shape defined by the identical form surfaces, the shape being such that light striking the reflective surface is redirected generally onto an axis extending generally parallel to the sheet from the first form member to the second form member, an energy absorbing target extending along the axis, and a tensioning structure for tensioning the sheet between the first and second form members. The improvement comprises having the tensioning structure act between the first and second form members. A relatively light weight structure is provided which can be constructed very close to the ground to avoid wind loads. Use of flexible plumbing can be avoided. Construction is relatively quick and inexpensive.

11 Claims, 12 Drawing Figures

INTERIORLY TENSIONED SOLAR REFLECTOR

CROSS-REFERENCE

This application is a continuation-in-part of copending application Ser. No. 710,581, filed Mar. 11, 1985 which is in turn a continuation of application Ser. No. 526,632 filed Aug. 26, 1983, now U.S. Pat. No. 4,510,923 issued Apr. 16, 1985.

DESCRIPTION

1. Field of the Invention

The invention relates to a solar reflector in the nature of an arcuate, generally parabolic, surface which concentrates solar radiation upon an energy absorbing target which is located at the focus of the surface and which is generally in the nature of a flowing fluid containing tube but which may instead constitute an array of solar cells.

2. Background

Generally, reflecting solar troughs are made of shiny relatively heavy reflector sheets which are backed by supporting ribs. Primarily because of manufacturing limitations at the mill there are certain necessary restrictions on the areas of the sheets. Consequently, a multiplicity of such reflectors are often required for a given solar energy project. As a rule, the sheets with rigid supporting ribs are assembled at a plant site because of the difficulty and expense in attempting to assemble the sheets and ribs in the field. As a result, the mirrors are heavy and bulky and difficult to ship. This adds cost to the finished product.

U.S. Pat. No. 4,293,192, issued Oct. 6, 1981, to Allen I. Bronstein, sets forth a solar reflector which is collapsible and portable and which will maintain its true configuration without the requirement of supporting ribs. The invention of this patent includes the use of a slideway on which two form members are supported, the forms members having identical surfaces around a portion of their peripheries, which identical surfaces conform precisely to the desired configuration of the reflecting surface. A flexible sheet of highly reflecting material is wrapped tightly around the surfaces and secured in place, and at least one of the forms is mounted on a slide which is moved away from the other form until the flexible sheet is in tension. Thereby, the flexible sheet conforms precisely to the curvature of the form surfaces over its full length. The slidway is pivoted on support legs so that it may be tilted sideways at a selected angle, depending on the angle of the sun. Strips of tape may be adhered to the outer or convex surface of the material to dampen it against wind vibration.

While the invention of U.S. Pat. No. 4,293,192 provides significant advantages over the prior art rib-supported solar reflectors, the apparatus taught therein is of relatively heavy construction, is not as easily tiltable as might be desired and is not as readily assemblable as might be desired. Still further, the apparatus is generally not readily anglable endwise with one end of the solar reflector higher than the other to compensate for differences in latitude.

U.S. Pat. No. 4,205,659, issued June 3, 1980 to Benjamin H. Beam, sets forth a lightweight solar reflector in the nature of a frame comprising a pair of end form members connected together by thin but rigid beams, the frame having an arcuate piece of stiff aluminum sheet metal connected at its ends to identical form surfaces of the form members and at its sides to the rigid beams. A water carrying pipe extends along the focus of the aluminum sheet and is rotatably mounted to the end form members at openings which pass therethrough.

While the invention of U.S. Pat. No. 4,205,659 provides a relatively light weight solar reflector, the thin strips or beams which provide rigidity to such a reflector can easily be damaged thereby ruining the focus of the reflector. Furthermore, if such damage occurs repairs are relatively difficult to accomplish in that they may require removal of rivets to replace or straighten the thin strips followed by rivetting. Yet further, unless coefficients of thermal expansion are carefully selected, significant bending can occur in the aluminum sheet at some temperatures. Also, the entire non-cross braced frame must be constructed to exacting standards to provide the desired curvature; and, such curvature must be maintained on installation which is quite difficult with a non-cross braced rectangular frame. This makes for installation and maintenance tasks which require considerable expertise. Still further, because of the drawbacks mentioned above, such solar reflectors are generally quite limited in size and cannot readily provide more than about a 16 square foot opening.

U.S. Pat. No. 4,510,923, issued Apr. 16, 1985 to Allen I. Bronstein, sets forth a tensioned solar reflector which comprises a longitudinally extending frame structure having first and second frame ends and a second end closure. A first form member is inboard of the first end. A second form member is parallel to the first form member and inboard of the second end closure. The form members have peripheries having identical form surfaces along portions thereof. A support member is attached to either the second end closure or the second form member and is adapted for transferring the weight of the second form member to the second end closure. A flexible sheet having a reflective infacing surface has its opposite edges secured to the identical form surfaces. Stretching means stretch the flexible sheet between the first and second form members and into the desired, generally parabolic, shape. Such a solar reflector provides significant advantages over the prior art rib-supported solar reflectors, the solar reflector as described in U.S. Pat. No. 4,293,192, and the solar reflector as taught in U.S. Pat. No. 4,205,659. It is relatively easy to assemble, it is relatively light, a plurality of such reflectors can generally be mounted in a single frame structure, the frame structure can be made tiltable sideways to allow adjustment for different sun angles, and the frame can be balanced on a pair of pillow blocks to provide tilt adjustment.

While the invention of U.S. Pat. No. 4,510,923, provides such advantages as are mentioned above as compared to prior art constructions, the weight of the apparatus is still not as low as would be desired because of the weight of the framing structure. Further, with such a multiple trough framing structure as is taught in this patent, the reflectors must generally be mounted relatively high above the ground whereby it is exposed to significant wind forces. Yet further, such a structure is not as easy as would be desirable to angle with one end of the reflector higher than the other to compensate for differences in latitude. Also, as the frame of the solar reflector of this patent is tilted the receptor pipe or tube is moved whereby it is necessary to utilize flexible connections thereby providing possible leakage problems.

Yet further, an apparatus as taught in this patent is not as easy to assemble and repair as might be desirable.

DISCLOSURE OF INVENTION

The present invention is directed to overcoming one or more of the problems as set forth above.

The present invention is directed to an improvement in a solar reflector having a first form member, a second form member, the first and second form members having peripheries having identical form surfaces along portions thereof, a generally rectangular flexible sheet having a reflective surface, opposite edges and lateral edges, securing means for securing the opposite edges to the identical form surfaces with the reflective surface being infacing, the reflective surface having a shape defined by the identical form surfaces, such shape being such that light striking the reflective surface is directed generally on to an axis extending generally parallel to the sheet from the first form member to the second form member, an energy absorbing target extending along the axis, means for supporting said first form member, means for supporting said second form member, and tensioning means for tensioning the sheet between the first and second form members. The improvement of the invention comprises having the tensioning means act between the first and second form members.

An improved solar reflector as set forth above has a number of advantages over its prior art predecessors. Since there is no external frame it is relatively light, inexpensive, easy to build and easy to ship. Assembly and alignment are relatively straightforward. The apparatus can be easily angled for more efficient following of the sun, for example one end of the solar reflector can be significantly lower than another end to compensate for differences in latitude. Importantly, wind loading on such a structure can be much reduced as the structure can be constructed very near to the ground. Also importantly, the plumbing which connects to the target, when it is an energy absorbing tube, usually requires no flexible joints thus cutting down on installation and maintenance costs.

BRIEF DESCRIPTION OF THE DRAWINGS

The invention will be better understood by reference to the figures of the drawings wherein like numbers denote like parts throughout and wherein.

BEST MODE FOR CARRYING OUT INVENTION

Figure 1:
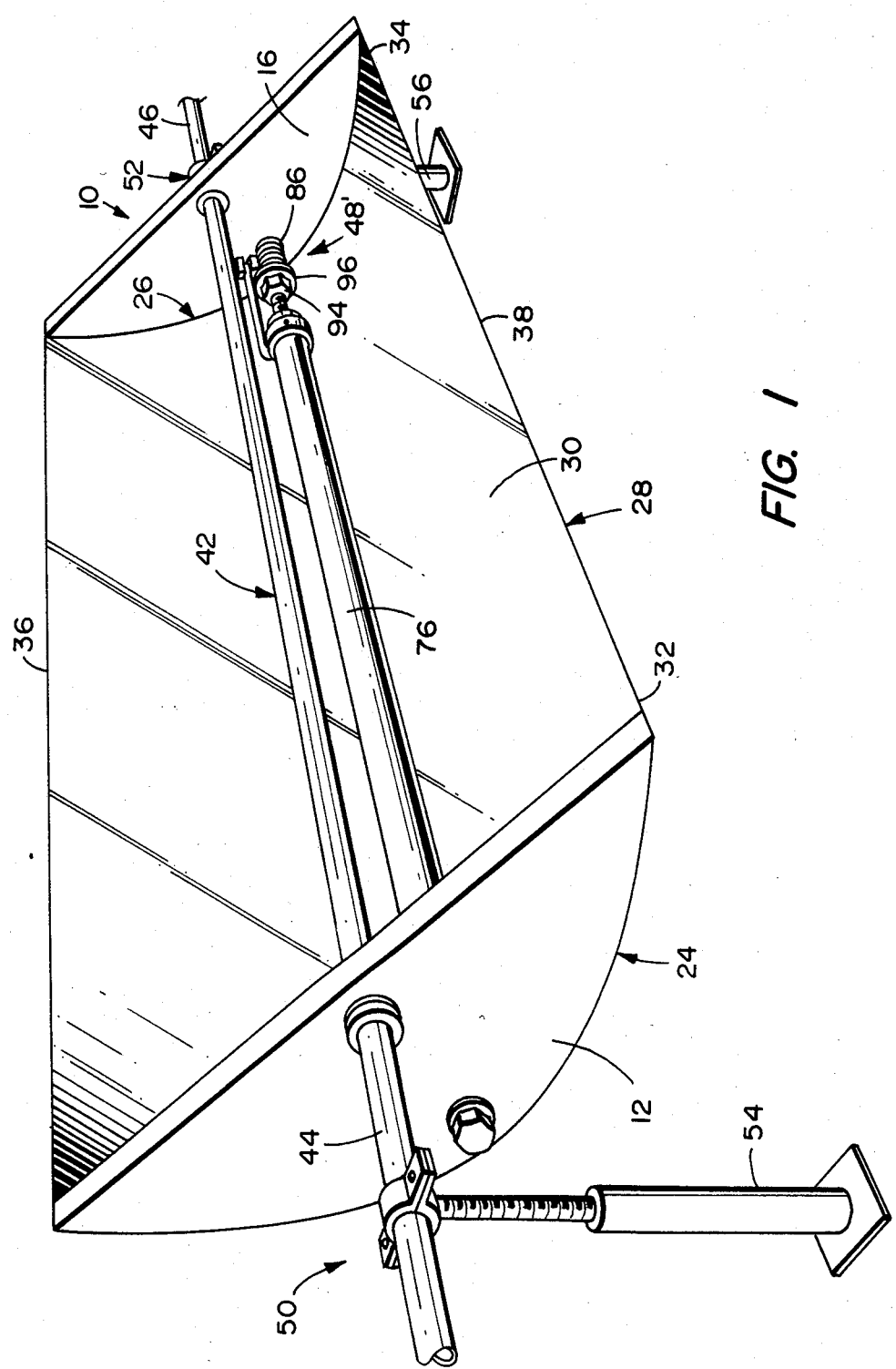
FIG. 1 illustrates, in perspective, a solar reflecting apparatus in accordance with an embodiment of the present invention.
Figure 4:
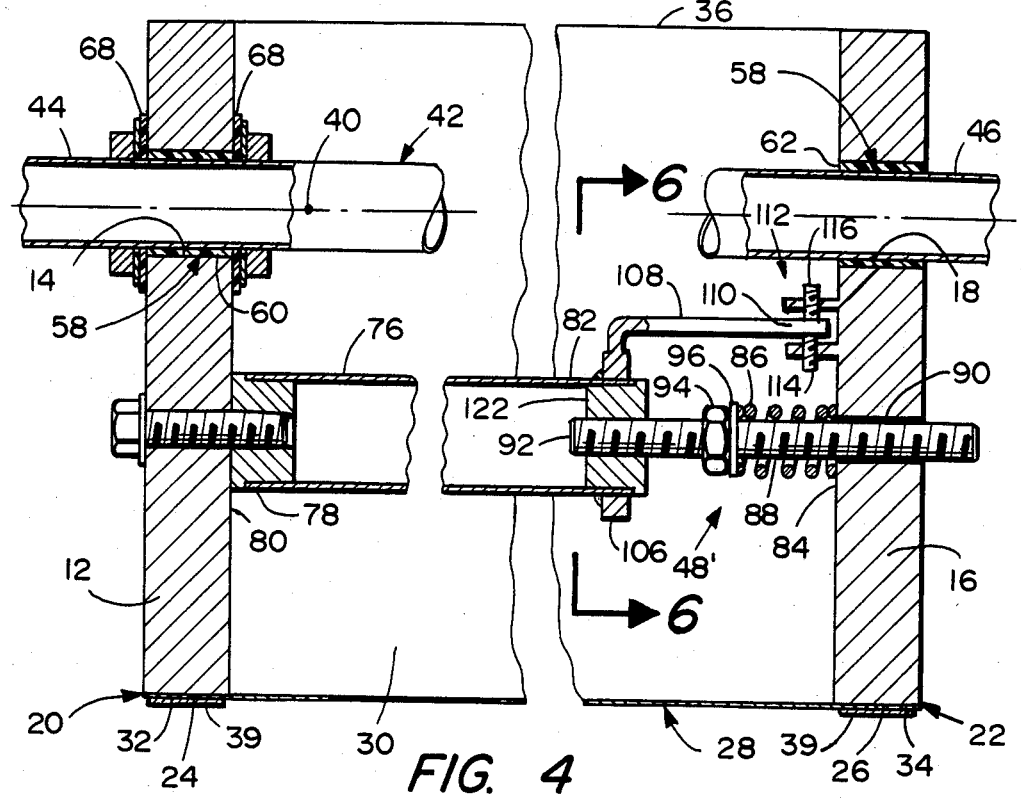
FIG. 4 illustrates, in partial side sectional view a modification of the embodiment of FIG. 1 with a positioning finger portion moved 45° for clarity.
Figure 6:
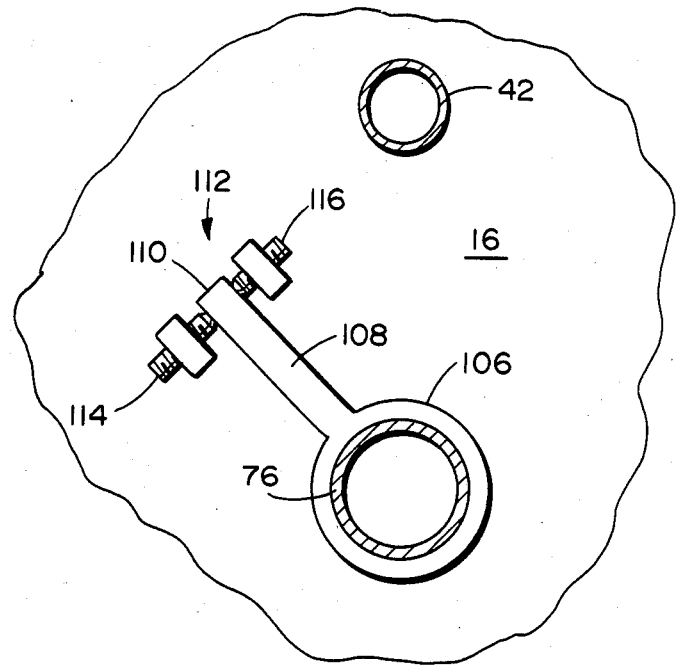
FIG. 6 illustrates, a partial view taken along the line VI—VI of FIG. 4.

A solar reflector 10 in accordance with an embodiment of the present invention is illustrated in FIGS. 1, 4 and 6. The solar reflector 10 has a first form member 12 having a first opening 14 passing therethrough. A second form member 16 has a second opening 18 which passes therethrough. The first and second form members 12 and 16 have peripheries 20 and 22 which have identical form surfaces 24 and 26 along portions thereof. A generally rectangular flexible sheet 28 which has a reflective surface 30, opposite edges 32 and 34 and lateral edges 36 and 38 has its opposite edges 32 and 34 secured by securing means 39 to the identical form surfaces 24 and 26 with the reflective surface 30 being infacing. The reflective surface 30 has a shape defined by the identical form surfaces 24 and 26 when the flexible sheet 28 is tensioned, the shape being such that light striking the reflective surface 30 is redirected onto an axis 40 which extends generally from the first opening 14 to the second opening 18. A target, generally in the form of an energy absorbing tube 42, extends along the axis 40 and has a first end 44 extending through the first opening 14 and a second end 46 extending through the second opening 18. Tensioning means 48' serve for tensioning the sheet 28 between the first and second form members 12 and 16.

In accordance with the present invention the tube 42 supports the first and second form members 12 and 16 at the first and second openings 14 and 18. The tube 42 itself is supported at its first end 44 by first support means 50 and at its second end 46 by second support means 52. The first support means 50 and the second support means 52 can comprise, for example, support posts 54,56 which may sit upon or be attached to the ground or a roof.

Figure 12:
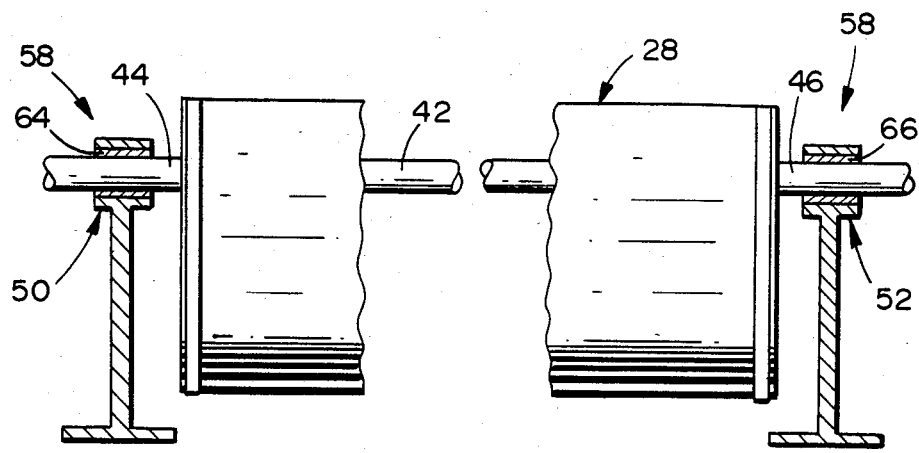
FIG. 12 illustrates, in side partial sectional view, an alternate construction useful with various embodiments of the invention.

Mounting means 58 are generally provided for mounting the solar reflector 10 for rotation about the axis 40. The mounting means 58 can take any of several forms. For example, the mounting means 58 may be located at the first and second openings 14 and 18 in the first and second form members 12 and 16. Such mounting means 58 may simply be the cylindrical surfaces of the first and second openings 14 and 18. More usually, such mounting means 58 will be appropriate bearings 60,62 which fit respectively within the openings 14 and 18. Alternatively, and as is shown in FIG. 12, the mounting means 58 may be located at the first and second support means 50 and 52. For example, appropriate bearings 64 and 66 may rotatably support, respectively, the first and second ends 44 and 46 of the tube 42. In such an instance the plumbing which is attached to the tube 42 will have to be flexible or will have to otherwise compensate for the rotary motion of the tube 42. As yet another alternative, the mounting means 58 may include, for example, the bearing 60 at the first opening 14 and the bearing 66 at the second support means 52, or may comprise the bearing 62 at the second opening 18 and the bearing 64 at the first support means 50.

Figure 3:
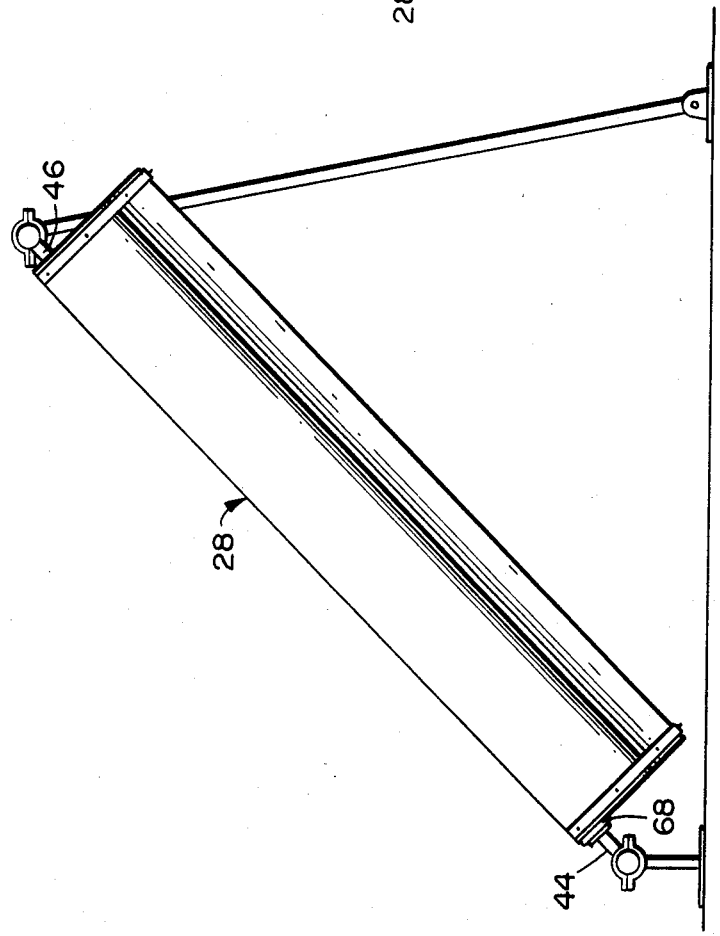
FIG. 3 illustrates, in side view, a solar reflecting apparatus in accordance with one or more embodiments of the present invention aligned to compensate for latitude.

Generally, the tube 42 is axially fixably mounted to the first form member 12 at the first opening 14 and is axially movably mounted to the second form member 16 at the second opening 18. The mounting of the tube 42 at the first opening 14 is generally via use of a thrust bearing 68. Referring to FIG. 3, the thrust bearing 68 can be located at the either end of the solar reflector 10 so as to allow for orientation as shown in FIG. 3 with retention of tension in the sheet 28.

In accordance with the invention, the tensioning means 48 acts between the first and second form members 12 and 16. In accordance with the embodiment illustrated in FIGS. 2 and 5 the tensioning means 48 acts between the tube 42 and the second form member 16. In the embodiment illustrated in FIGS. 2 and 5, the tensioning means 48 includes a compression spring 70 to provide compensation for different thermal expansion coefficients of the various components. The compression spring 70 is located about the tube 42 and bears against a washer 71, thrust bearing 73, and thereby against the second form member 16. The compression spring 70 also bears against a sleeve 72 which fits about the tube 42. The sleeve 72 is generally threadably attached to a collar 74 which is fixably attached about the tube 42. In this manner, the tension in the sheet 28 can be adjusted by rotating the sleeve 72. Alternatively, the sleeve 72 can simply be threadably attached to the exterior of the tube 42.

In order to assure that tension is uniform throughout the sheet 28 the first and second openings 14 and 18 are substantially centered at positions of the first and second form members 12 and 16 such that the net moments due to the force exerted on each of the form surfaces 24 and 26 by the sheet 28, due to the tension, are of substantially zero magnitude, where by no distortions result in the sheet 28 In such an instance, and with a parabolic cross section for the sheet 28, in order to obtain maximum heating of the tube 42, the shapes of the form surfaces 24 and 26, which determine the shape of the reflective surface 30, are generally selected to be such that the reflective surface 30 has a parabolic rim angle (the angle which an incoming beam of light, parallel to the longitudinal bisecting plane of the reflective surface 30 and striking the reflective surface 30 at a lateral edge, makes with a resulting reflected beam of light which is directed to the focus of the reflective surface 30) which is substantially 115.77°. While this exact angle is preferred for a parabolic sheet for maximal use of solar energy, quite efficient use of solar energy still results when the rim angle varies somewhat, e.g., within ±2° to 3°, from this value.

FIGS. 1, 4 and 6 illustrate an embodiment of the present invention which utilizes an alternative tensioning means 48'. The tensioning means 48' includes a beam 76, generally and preferably in the nature of a hollow relatively thin walled but rigid tube, having a first end portion 78 attached to a first area 80 of the first form member 12 and a second end portion 82 which extends to adjacent a second area 84 of the second form member 16. The tensioning means 48' acts between the beam 76 and the second area 84 of the second form member 16 as will be seen most clearly in FIG. 4. In accordance with the embodiment of FIG. 4 a compression spring 86 acts between the second form member 16 and the beam 76. The spring 86 fits about a threaded member 88 which passes freely through a bore 90 in the second form member 16. The threaded member 88 is attached at one end 92 thereof to the beam 76. A nut 94 and washer 96 fit about the threaded member 88 with the washer 96 bearing against the end of the spring 86 nearest the beam 76. The nut 94 is threadably mounted to the threaded member 88 and can be tightened against the washer 96 which in turn is tightened against the spring 86. In this manner, the tension in the sheet 28 can be adjusted. In this embodiment of the present invention the first and second areas 80 and 84 are located substantially at positions of the first and second form members 12 and 16 whereat the net moments due to the force exerted on each of the form surfaces 24 and 26 due to the tension in the sheet 28 are of substantially zero magnitude. This provides for uniform tensioning of the sheet 28 to match the shape of the form surfaces 24 and 26. If the moments are unbalanced, distortions in sheet 28 can occur.

Figure 2:
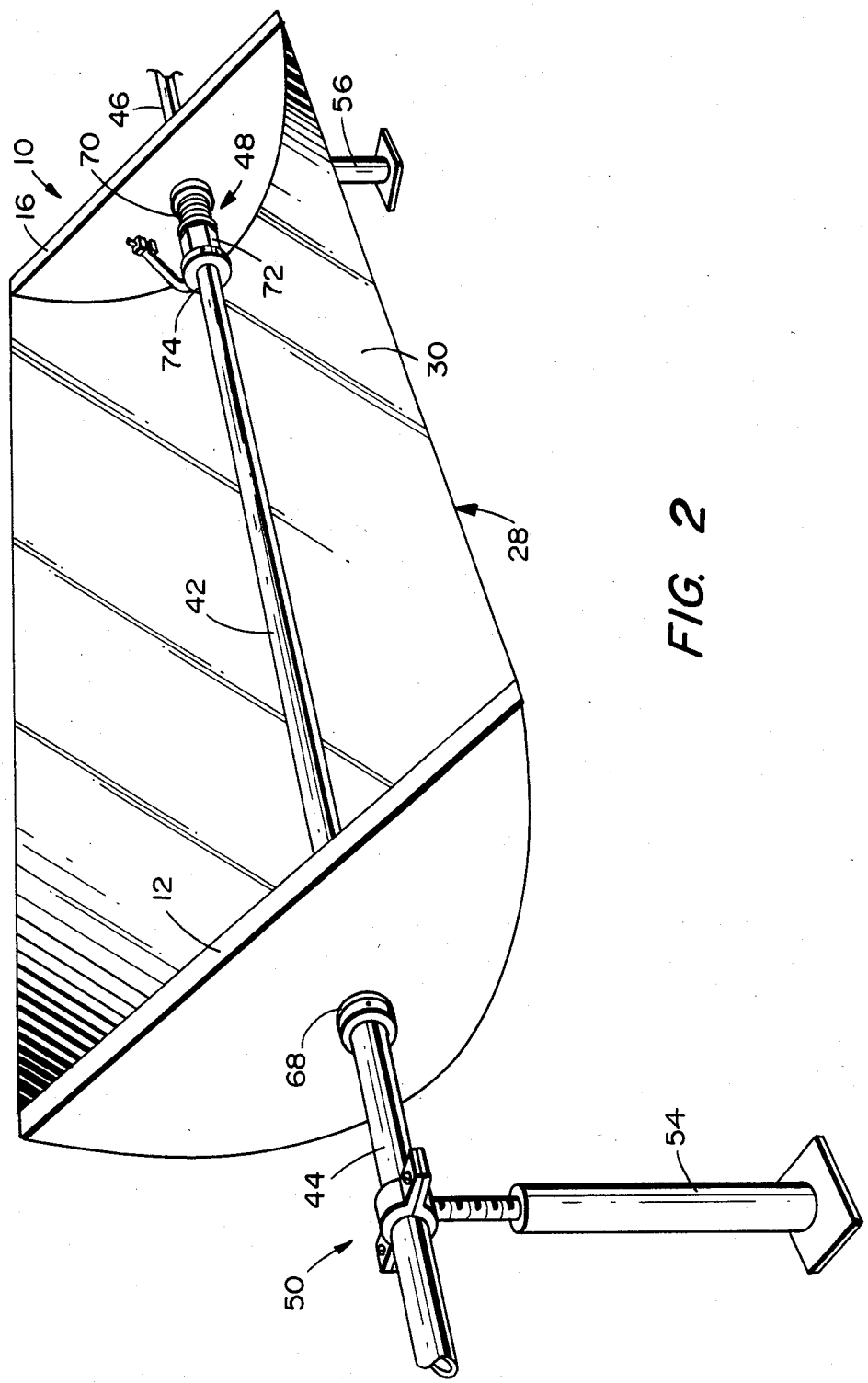
FIG. 2 illustrates, in perspective, a solar reflecting apparatus in accordance with another embodiment of the present invention.
Figure 5:
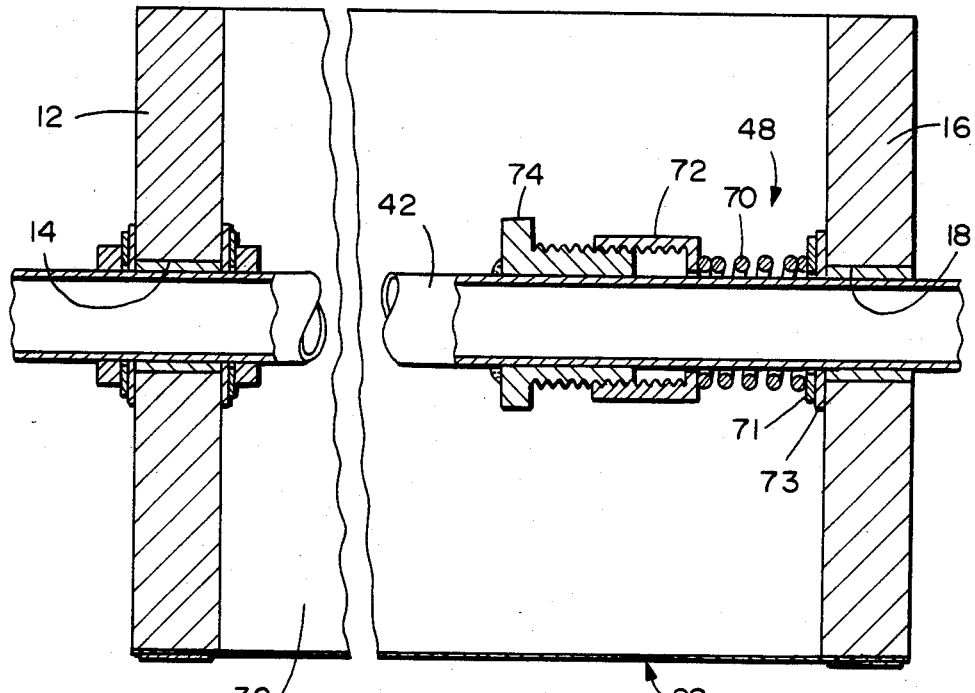
FIG. 5 illustrates, in side partial sectional view, the embodiment of FIG. 2.

As with the embodiment of FIGS. 2 and 5, the tube 42 may be axially fixably mounted to the first form member 12 at the first opening 14 and may be axially movably mounted to the second form member 16 at the second opening 18.

Figure 7:
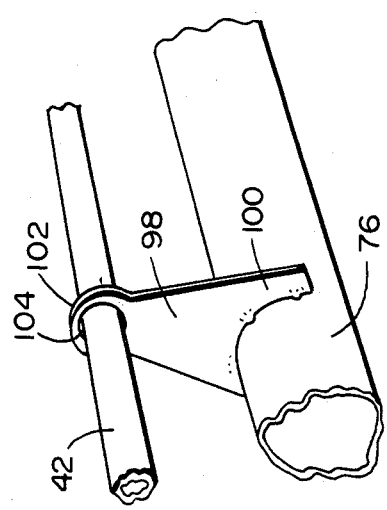
FIG. 7 illustrates, in partial perspective view, an optional structure useful with the embodiment of FIG. 1.

FIG. 7 shows a support 98 which is useful with the embodiment which utilizes both the beam 76 and the tube 42. The support 98 has a first portion 100 and a second portion 102 having a hole 104 which passes through it. The first portion 100 of the support 98 is attached to the beam 76 and the hole 104 surrounds the tube 42. The hole 104, which may contain a bearing, has a slightly larger diameter than does the tube 42 so as to allow the tube 42 to rotate relative to the hole 104. Generally, the support 98 provides extra stiffening for the tube 42. In this manner, any possible sag in the tube 42 can be eliminated. Thereby, the entire length of the tube 42 is positioned so as to receive a maximized amount of the light which strikes the reflective surface 30.

Adverting now principally to FIG. 4, it will be seen that a collar 106 may be integral with or attached about the second end portion 82 of the beam 76. A finger 108 which is attached to the collar 106, as, for example, by being integral therewith, extends parallel to the beam 76 to closely adjacent the second form member 16 a spaced distance laterally from the second area 84. A tip 110 of the finger 108 can then be laterally aligned by lateral aligning means 112, for example a series of set screws 114 and 116 so that the finger 108 is desirably aligned relative to the second form member 16. In particular, the finger 108, and with it the beam 76, can thereby be accurately aligned with respect to the second form member 16.

Figure 8:
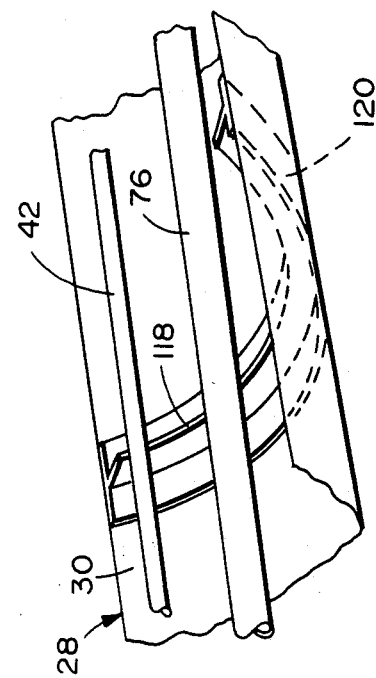
FIG. 8 illustrates, in partial perspective view, an optional structure usable with the embodiments of FIGS. 1 and 2.

A support rib 118 (FIG. 8) may be provided and serves a useful purpose whether or not the beam 76 is present. The support rib 118 has an attachment surface 120 which is shaped substantially identically to the reflective surface 30. The rib 118 is attached to the sheet 30 at the attachment surface 120 intermediate the first and second form members 12 and 16. Basically, the support rib 118, which can be relatively light in weight but should be rigid, serves to reinforce the effect of the tension in the sheet 28 to cause the sheet 28 to maintain the desired shape set by the identical form surfaces 24 and 26. It is particularly useful to make use of the rib 118 when the length of the sheet 28 from the first form member 12 to the second form member 16, is particularly long, for example 15 feet or more. The rib 118 also serves to provide stiffening against wind forces.

As mentioned previously, the beam 76 is not necessarily, or even preferably, a solid beam. Instead, the beam 76 may be in the nature of a hollow tube. This provides the needed rigidity while maintaining relatively low weight for the overall solar reflector 10. In such an instance, the threaded member 88 may thread into a plug 122 at the second end portion 82 of the beam 76.

Figure 9:
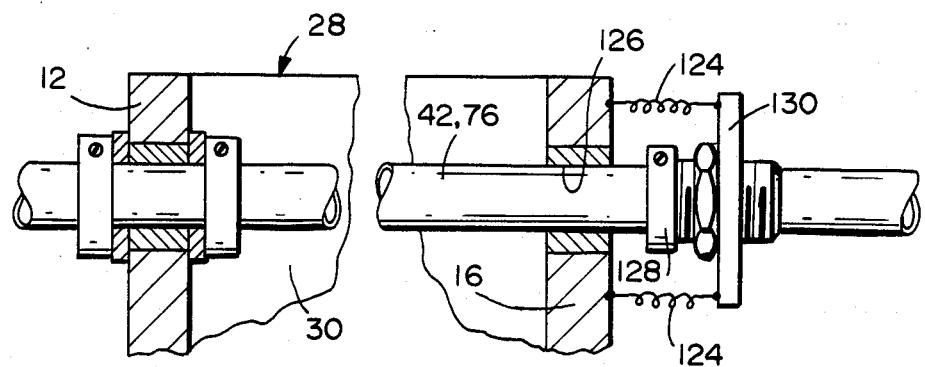
FIG. 9 illustrates, in partial side partially sectional view, an alternative tension means useful in the practice of the invention.

In the embodiment wherein the tensioning means 48 acts between the tube 42 and the second form member 16 and the mounting means 58 is not located at the second opening 18, and in the embodiment wherein the tensioning means 48' includes the beam 76 and acts between the beam 76 and the second form member 16, the compression springs 70 and 86 can be replaced with a tension spring 124 as illustrated in FIG. 9. In the embodiment of FIG. 9, the tube 42 or beam 76 extends through the opening 126 (which would correspond to the second opening 18 in the case of the tube 42). A thredded collar 128 is attached about the tube 42 or beam 76 outboard of the second form member 16. The tension spring 124 then acts between an annulus 130, which bears against the collar 128, and the second form member 16. As in the embodiments which utilize the compression springs 70 and 86, a telescoping non-spring construction can be substituted for the tension spring 124. However, different coefficients of thermal expansion of the various parts may then cause problems. Also, the mechanical springs 70,86 and 124 can be replaced by their pneumatic or hydraulic functional equivalents.

Figure 10:
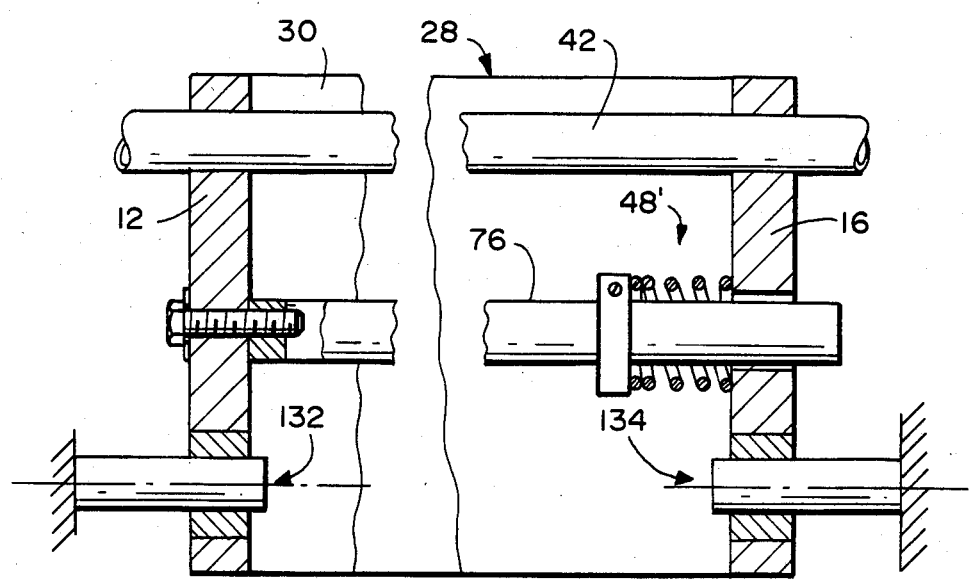
FIG. 10 illustrates, in partial side partially sectional view, another alternative support means useful in the practice of the invention.

FIG. 10 illustrates still another alternate embodiment of the invention. In the embodiment of FIG. 10 the beam 76 is a part of the tensioning means 48' and a separate tube 42 is located along the focus of the reflective surface 30. FIG. 10 differs from other embodiments in that the first and second form members 12 and 16 are separately rotatably mounted to conveniently located pivots 132 and 134. Flexible connection is required to the tube 42.

Figure 11:
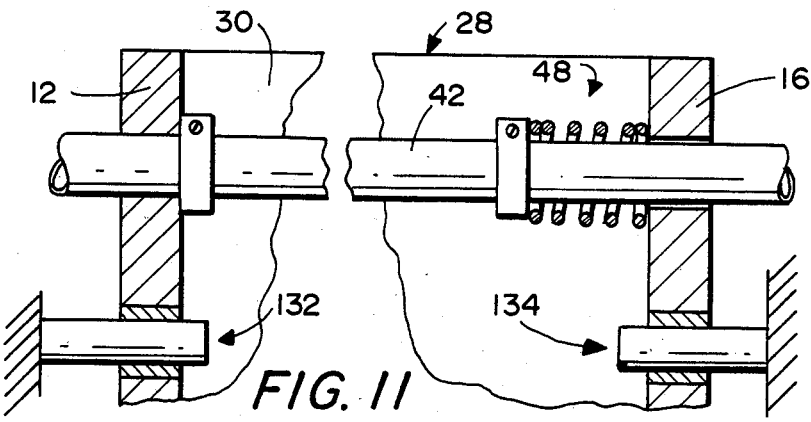
FIG. 11 illustrates, in partial side partially sectional view, yet another alternative support means and mounting means useful in the practice of the invention.

FIG. 11 shows an embodiment similar to that of FIG. 10 but wherein the tensioning means 48 acts between the tube 42 and the second form member 16. Again, flexible connection is required to the tube 42.

INDUSTRIAL APPLICABILITY

A solar reflector 10 is provided in accordance with the present invention which is useful for concentrating the sun's rays to heat fluids in pipes or tubes 42, or to otherwise generate useful energy. The heated fluid can be used to generate energy, to heat a living or work space, to produce steam, to heat process fluids, or the like.

While the invention has been described in conjunction with certain preferred embodiments thereof it will be obvious that modifications and changes may be made in the invention by those skilled in the art to which it pertains without departing from the scope of the invention as defined by the appended claims.

I claim:

1. In a solar reflector having a first form member, a second form member, said first and second form members having peripheries having identical form surfaces along portions thereof, a generally rectangular flexible sheet having a reflective surface, opposite edges and lateral edges, securing means for securing the opposite edges to the identical form surfaces with the reflective surface being infacing, the reflective surface having a shape defined by the identical form surfaces, the shape being such that light striking the reflective surface is redirected generally on to an axis extending generally parallel to the sheet from the first form member to the second form member, an energy absorbing target extending along said axis, means for supporting said first form member, means for supporting said second form member, and tensioning means for tensioning said sheet between said first and second form members, an improvement comprising:

wherein said tensioning means acts between said first and second form members, said first form member has a first opening therethrough, said second form member has a second opening therethrough, said energy absorbing target has a first end extending through said first opening and a second end extending through said second opening, said first form member supporting means includes first support means for supporting said first end of said energy absorbing target, said second form member supporting means includes second support means for supporting said second end of said energy absorbing target, and said energy absorbing target supports said first and second form members at said first and second openings;

wherein said tensioning means includes a beam having a first end portion thereof attached to a first area of said first form member and a second end portion thereof extending to adjacent a second area of said second form member and wherein said tensioning means acts between said beam and said second area of said second form member; and further including:

rotational mounting means for mounting said solar reflector for rotation about said axis; and a support having a first portion and a second portion having a hole therethrough, said first portion being attached to said beam and said hole surrounding said target, said support being positioned intermediate said end portions of said beam and intermediate said ends of said target, said target being rotatable within said hole.

2. A solar reflector as set forth in claim 1, wherein said rotational mounting means is located at said first and second openings.

3. A solar reflector as set forth in claim 1, wherein said rotational mounting means is located at said first and second support means.

4. A solar reflector as set forth in claim 1, wherein said rotational mounting means is located at a selected one of said first opening in said first support means and in a selected other of said second opening and said second support means.

5. A solar reflector as set forth in claim 1, wherein said target is axially fixably mounted to said first form member at said first opening and is axially movably mounted to said second form member at said second opening and wherein said tensioning means acts between said target and said second form member.

6. A solar reflector as set forth in claim 5, wherein said tensioning means includes a compression spring.

7. A solar reflector as set forth in claim 1, wherein said first and second areas are substantially at positions of said first and second form members whereat the net moments due to the force exerted on each of said form surfaces by said sheet are of substantially zero magnitude.

8. A solar reflector as set forth in claim 7, wherein said target is axially fixedly mounted to said first form member at said first opening and is axially movably mounted to said second form member at said second opening.

9. A solar reflector as set forth in claim 8, wherein said tensioning means includes a compression spring.

10. A solar reflector as set forth in claim 1, further including:
a support rib having an attachment surface shaped substantially identical to said reflective surface, said rib being attached to said sheet at said attachment surface intermediate said first and second form members.

11. In a solar reflector having a first form member, a second form member, said first and second form members having peripheries having identical form surfaces along portions thereof, a generally rectangular flexible sheet having a reflective surface, opposite edges and lateral edges, securing means for securing the opposite edges to the identical form surfaces with the reflective surface being infacing, the reflective surface having a shape defined by the identical form surfaces, the shape being such that light striking the reflective surface is redirected generally on to an axis extending generally parallel to the sheet from the first form member to the second form member, an energy absorbing target extending along said axis, means for supporting said first form member, means for supporting said second form member, and tensioning means for tensioning said sheet between said first and second form members, an improvement comprising:

wherein said tensioning means acts between said first and second form members, said first form member has a first opening therethrough, said second form member has a second opening therethrough, said energy absorbing target has a first end extending through said first opening and a second end extending through said second opening, said first form member supporting means includes first support means for supporting said first end of said energy absorbing target, said second form member supporting means includes second support means for supporting said second end of said energy absorbing target, and said energy absorbing target supports said first and second form members at said first and second openings; and further including:
rotational mounting means for mounting said solar reflector for rotation about said axis;
wherein said tensioning means includes a beam having a first end portion thereof attached to a first area of said first form member and a second end portion thereof extending to adjacent a second area of said second form member and wherein said tensioning means acts between said beam and said second area of said second form member; and further including:
a collar attached about said second end portion of said beam;
a finger attached to said collar, said finger extending parallel to said beam closely adjacent said second form member a spaced distance from said second area; and
means for laterally aligning said finger relative to said second form member.

* * * * *